United States Patent
Lakshmanan et al.

(10) Patent No.: US 11,734,559 B2
(45) Date of Patent: Aug. 22, 2023

(54) AUTOMATED STRUCTURED TEXTUAL CONTENT CATEGORIZATION ACCURACY WITH NEURAL NETWORKS

(71) Applicant: Microsoft Technology Licensing, LLC, Redmond, WA (US)

(72) Inventors: Charumathi Lakshmanan, Bellevue, WA (US); Ye Li, Redmond, WA (US); Arnold Overwijk, Redmond, WA (US); Chenyan Xiong, Bellevue, WA (US); Jiguang Shen, Bellevue, WA (US); Junaid Ahmed, Bellevue, WA (US); Jiaming Guo, Kirkland, WA (US)

(73) Assignee: MICRSOFT TECHNOLOGY LICENSING, LLC, Redmond, WA (US)

( * ) Notice: Subject to any disclaimer, the term of this patent is extended or adjusted under 35 U.S.C. 154(b) by 275 days.

(21) Appl. No.: 16/907,165

(22) Filed: Jun. 19, 2020

(65) Prior Publication Data
US 2021/0397944 A1    Dec. 23, 2021

(51) Int. Cl.
*G06N 3/08*    (2023.01)
*G06F 16/957*    (2019.01)
(Continued)

(52) U.S. Cl.
CPC .......... *G06N 3/08* (2013.01); *G06F 9/30036* (2013.01); *G06F 16/9577* (2019.01); *G06F 40/30* (2020.01); *G06N 3/045* (2023.01)

(58) Field of Classification Search
CPC ..... G06N 3/08; G06N 3/0454; G06F 16/9577
See application file for complete search history.

(56) References Cited

U.S. PATENT DOCUMENTS 8,775,341 B1    7/2014 Commons
2016/0342681 A1    11/2016 Kesin
(Continued)

FOREIGN PATENT DOCUMENTS

JP    4629280 B2 *    2/2011

OTHER PUBLICATIONS

"International Search Report & Written Opinion issued in PCT Application No. PCT/US21/029026", dated Jul. 6, 2021, 11 Pages.
(Continued)

*Primary Examiner* — Scott C Anderson
(74) *Attorney, Agent, or Firm* — Calfee, Halter & Griswold LLP

(57) ABSTRACT

To provide automated categorization of structured textual content individual nodes of textual content, from a document object model encapsulation of the structured textual content, have a multidimensional vector associated with them, where the values of the various dimensions of the multidimensional vector are based on the textual content in the corresponding node, the visual features applied or associated with the textual content of the corresponding node, and positional information of the textual content of the corresponding node. The multidimensional vectors are input to a neighbor-imbuing neural network. The enhanced multidimensional vectors output by the neighbor-imbuing neural network are then be provided to a categorization neural network. The resulting output can be in the form of multidimensional vectors whose dimensionality is proportional to categories into which the structured textual content is to be categorized. A weighted merge takes into account multiple nodes that are grouped together.

19 Claims, 11 Drawing Sheets

(51) Int. Cl.
*G06F 40/30* (2020.01)
*G06F 9/30* (2018.01)
*G06N 3/045* (2023.01)

(56) References Cited

U.S. PATENT DOCUMENTS

| | | | |
|---|---|---|---|
| 2018/0225032 A1* | 8/2018 | Jones | G06F 16/434 |
| 2019/0294874 A1* | 9/2019 | Orlov | G06F 40/20 |
| 2020/0302016 A1* | 9/2020 | Aggarwal | G06F 16/93 |
| 2020/0410303 A1* | 12/2020 | Swint | G06K 9/6269 |
| 2021/0027083 A1* | 1/2021 | Cohen | G06V 10/764 |
| 2021/0049236 A1* | 2/2021 | Nguyen | G06F 40/205 |

OTHER PUBLICATIONS

Xu, et al., "A Cascade Multiple Classifier System for Document Categorization", In Proceedings of International Workshop on Multiple Classifier Systems, Jun. 10, 2009, pp. 458-467.

* cited by examiner

AUTOMATED STRUCTURED TEXTUAL CONTENT CATEGORIZATION ACCURACY WITH NEURAL NETWORKS

BACKGROUND

Webpages often contain textual content that is secondary and does not represent the main reason a user would visit the webpage. For example, users often browse web forums, which are comprised of webpages having textual content authored by other users, often referred to as "posts". The textual content authored by other users is typically the information that draws users to such web forums. However, the webpages displaying such forum posts also include other textual content, such as a navigation bar providing links to other parts of the web forum, a title bar identifying the web forum, footers that can comprise links to other parts of the website, contact information and the like, as well as advertisements, and even individual user signatures or other like user identifying information that is displayed proximate to each user's post. A user visiting such a web forum will typically ignore such other textual content and, instead, focus upon the textual content that represents individual users' posts. Accordingly, a user wishing to, for example, search, such a web forum would desire to obtain search results that are sourced from individual users' posts, as opposed to, for example, an advertisement, or footer content.

Given the vast quantities of textual content generated on the Internet each day, the identification of textual content of a particular webpage that would be focused upon by human users cannot practically be performed by humans. However, identifying the textual content, from among a document of structured textual content, such as a webpage, that would be focused upon by human users, is difficult for computing devices to perform. Traditionally, computing devices have attempted to categorize different types of textual content, in order to facilitate the identification of content that would be meaningful to most human users, or so-called "semantically filtered content". Such categorization, however, has been individually performed. For example, computer-executable instructions designed to identify advertising content have been developed and executed independently of computer-executable instructions designed to identify header and footer content. Accordingly, such existing mechanisms do not exchange information, and information from one part of a document comprising structured textual content is not utilized to improve the categorization of the structured textual content from other parts of the document. Moreover, such existing mechanisms are improved independently, so that improvements to one type of categorization mechanism do not result in improvements to other mechanisms for categorizing other types of textual content. Existing mechanisms also typically comprise large "if/else" branches of computer executable instructions, which have limited representational power in semantically understanding and filtering the textual content.

SUMMARY

It is difficult for computing devices to automatically identify the textual content, within a document of structured textual content, that would be the point of focus of human users. Moreover, attempting to categorize portions of textual content into one category while independently and separately considering whether to categorize other portions of the same textual content into another, different category does not provide any cross-categorization, nor cross-content, information exchange. In an example solution to the problems described above, individual nodes of textual content from a document object model encapsulation of structured textual content have individual multidimensional vectors associated with them. This allows automated categorization of structured textual content that is both unified and takes into account information from multiple portions of the structured textual content. The values of the various dimensions of the multidimensional vector may be based on the textual content in the corresponding node, the visual features applied or associated with the textual content, and/or positional information of the textual content. The multidimensional vectors associated with the individual nodes of textual content can be ordered in accordance with the document object model encapsulation of the structured textual content and provided as a matrix of information to a neighbor-imbuing neural network. The resulting information from the neighbor-imbuing neural network can also be in the form of multidimensional vectors associated with the individual nodes, enhanced with information from neighboring nodes. The enhanced multidimensional vectors can then be provided as a matrix of information to a categorization neural network. The resulting output of the categorization neural network can be in the form of multidimensional vectors whose dimensionality is proportional to categories into which the structured textual content is to be categorized. A weighted merge can take into account the categorization applied to the textual content of multiple nodes that are grouped together within the document object model encapsulation of the structured textual content. From such a weighted merge, annotations can be generated identifying discrete portions of textual content in the structured textual content document. Such annotations, in combination with the structured textual content document itself, can be utilized to semantically understand and filter the textual content, resulting in semantically filtered textual content, which can then be utilized for other tasks, such as search index construction, keyword association and document evaluation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to providing automated categorization of structured textual content that is both unified and takes into account information from multiple portions of the structured textual content. To do so, individual nodes of textual content from a document object model encapsulation of the structured textual content can have a multidimensional vector associated with them, where the values of the various dimensions of the multidimensional vector are based on one or more of: the textual content in the corresponding node, the visual features applied or associated with the textual content of the corresponding node, and/or the positional information of the textual content of the corresponding node. The multidimensional vectors associated with the individual nodes of textual content can be are ordered in accordance with the document object model encapsulation of the structured textual content and provided as a matrix of information to a neighbor-imbuing neural network. The resulting information can also be in the form of multidimensional vectors associated with the individual nodes, except enhanced with information from neighboring nodes. The enhanced multidimensional vectors can then be provided as a matrix of information to a categorization neural network. The resulting output can be in the form of multidimensional vectors whose dimensionality is proportional to categories into which the structured textual content is to be categorized. A weighted merge can take into account the categorization applied to the textual content of multiple nodes that are grouped together within the document object model encapsulation of the structured textual content. From such a weighted merge, annotations can be generated identifying discrete portions of textual content in the structured textual content document. Such annotations, in combination with the structured textual content document itself, can be utilized to semantically understand and filter the textual content, resulting in semantically filtered textual content.

Figure 1:
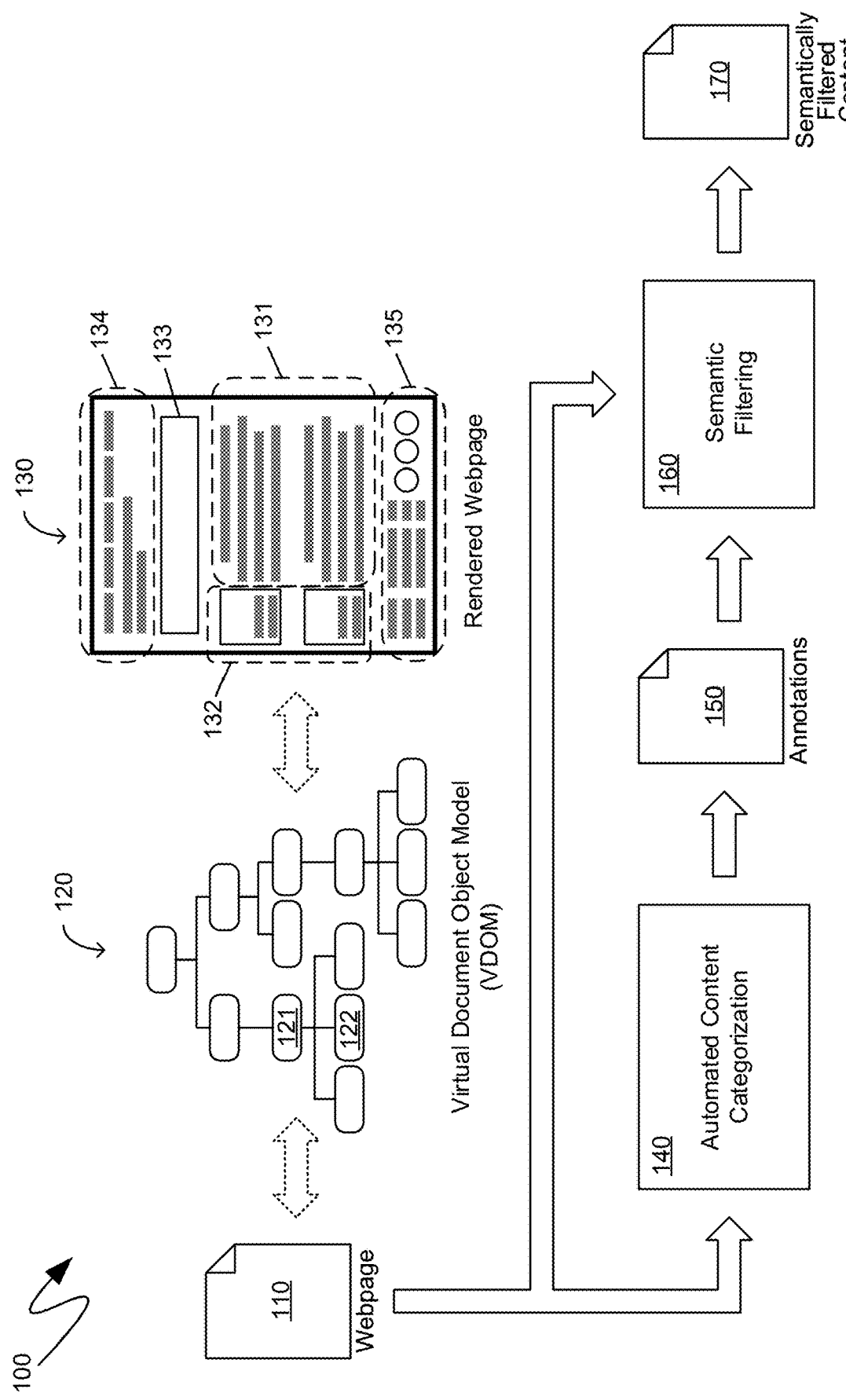
FIG. 1 is a block diagram of an example of generation of a semantically filtered structured textual content.

Turning to FIG. 1, the exemplary system 100 shown therein illustrates generation of a semantically filtered content, such as the exemplary semantically filtered content 170. As utilized herein, the term "semantically filtered content" means that sub-portion of textual content, from among a document of structured textual content, that is most likely the reason that a human user would request the structured textual content document. Stated differently, it is the sub-portion of textual content, from among a document of structured textual content, that is most likely to be most relevant to a human user. According to one aspect, semantically filtered content is generated as a result of filtering, such as the exemplary filtering 160, that is informed by annotations, such as the exemplary annotations 150, that identify defined ranges of a structured textual content document as belonging to one or more categories. The annotations, such as the exemplary annotations 150, can be generated by an automated content categorization system, such as the exemplary automated content categorization system 140, which can utilize neural networks, and whose operation is detailed further below. Within the exemplary system 100 of FIG. 1, a structured textual content document is shown in the form of the exemplary webpage 110. For clarity, the descriptions are provided within the context of a HyperText Markup Language (HTML) webpage, however the mechanisms described are equally applicable to other types of structured textual content (e.g., AXR, BBCode, and XML).

Structured textual content, such as the exemplary webpage 110, can be represented in the form of a document object model, where individual portions of the exemplary webpage 110 can be encapsulated into nodes that can define how content associated with those nodes is to be rendered, such as on a display device. Due to the dynamic aspect of some structured textual content, such as the exemplary webpage 110, certain aspects of the webpage 110 may only be rendered, or otherwise displayed, under specific circumstances, such as in response to specific user input or other like user actions, or at specific times. To provide a representation of the exemplary webpage 110 that accounts for such dynamic aspects, a Virtual Document Object Model (VDOM) can be utilized, such as the exemplary VDOM 120. As with a traditional document object model, individual content, programmatic instructions, or other like portions of the webpage 110 can be encapsulated into nodes, such as the exemplary nodes 121 and 122. A VDOM, such as the exemplary the exemplary VDOM 120, can be organized in a hierarchical graph structure with individual nodes acting as parents of other nodes having a lower hierarchical arrangement, while acting as children of nodes having a higher hierarchical arrangement. Thus, for example, in the exemplary VDOM 120, the exemplary node 122 can be a child node to the exemplary node 121, and the exemplary node 121 can be a parent node to the exemplary node 122. As utilized herein, the term "leaf node" means a node at a lowest hierarchical level, such that the node has no further children nodes beneath it in the hierarchical graph structure of the VDOM.

So as to facilitate conceptual understanding of the descriptions provided herein, reference is made to an exemplary rendered webpage 130. In particular, the exemplary webpage 110 can comprise structured textual content that can include both textual content to be displayed to a user, or other like consumer of the exemplary webpage 110, as well as programmatic content that defines how such textual content, and other audiovisual content, is to be presented to a user. Such programmatic content can include HTML tags that can define specific formatting or other like structural delineations to be applied to content, as well as script-based programmatic content that can define formatting, visual structure, interactivity, and other like rendering attributes. Often, the rendering of a webpage, such as the exemplary webpage 110, into the rendered representation of the webpage 130, can include the generation of a VDOM, such as the exemplary VDOM 120.

The exemplary rendered webpage 130 is illustrated, again so as to facilitate conceptual understanding of the descriptions provided herein, as a web forum webpage comprising content generated by users, such as in the form of forum posts. Such content is generally represented by the rendered user post content 131. A human user visiting the web forum will most likely do so for the purpose of consuming the rendered user post content 131, i.e., reading the posts of other users of the forum. Accordingly, given the definition explicitly provided above, the rendered user post content 131 represents the textual content that should be identified as the semantically filtered content 170, since such textual content will be the primary reason for which a human user visits the webpage 110.

However, in addition to the user post content 131, the webpage 110 can comprise other textual content. For example, within the context of a web forum, each of the posts in the user post content 131 can be associated with user-identifying information that can provide information about the user posting such content on the web forum. Such user-identifying information can include screen names, avatars or other like picture representations of users, post history, user generated signatures, and other like user-identifying information. Such user-identifying information is generally illustrated as the rendered user-identifying content 132. In instances where a single user generates multiple posts, such user-identifying content 132 will be repetitive and will likely bear little semantic relationship to the user post content 131. The webpage 110 can also comprise advertisements, such as the exemplary advertisement 133, which may not be relevant to the user post content 131. Additionally, the webpage 110 can also comprise headers or footers, such as the exemplary header 134, and the exemplary footer 135. The exemplary header 134 can include the title of the web form, links to other parts of the web forum, such as other discussion groups, drop-down menus to select various options, and other like content. Similarly, the exemplary footer 135 can include contact information, links to social media sites, various statistics, and other like content. As with the rendered user-identifying content 132, and the advertisement 133, the exemplary header 134 and the exemplary footer 135 can comprise textual content that has little or no semantic relationship to the user post content 131. Stated differently, human users will most likely visit the webpage 110 for the user post content 131 and not the user-identifying content 132, the advertisement 133, the exemplary header 134, nor the exemplary footer 135. Accordingly, the semantically filtered content 170 should comprise the former and exclude the latter.

Figure 2A:
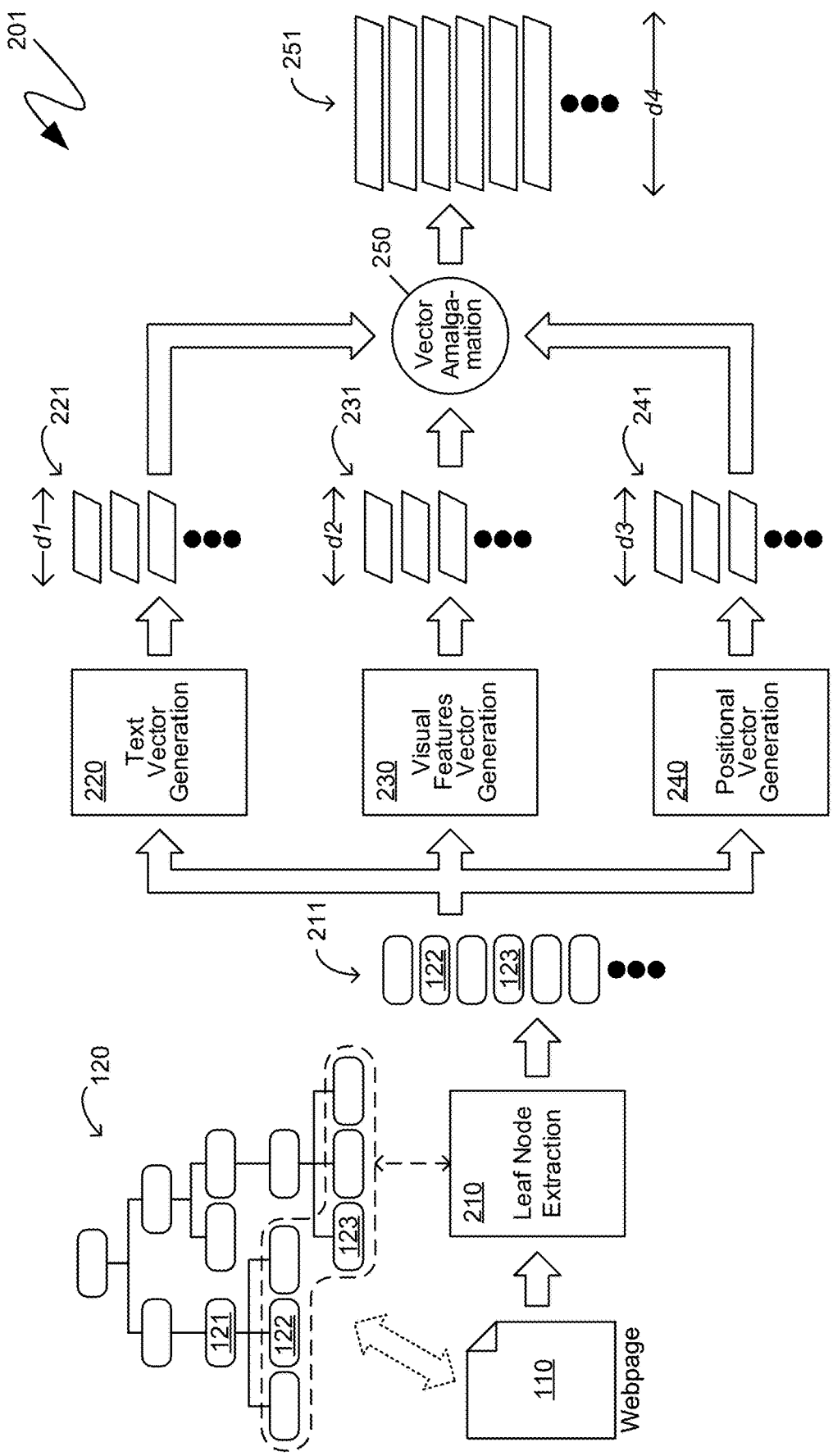
FIGS. 2a-2b are block diagrams of an example of categorization of structured textual content.

Turning to FIG. 2a, the exemplary system 201 shown therein illustrates an exemplary portion of a system that can perform automated content categorization, such as performed by the automated content categorization 140 shown previously in the exemplary system 100 of FIG. 1. With reference to the exemplary system 201 of FIG. 2a, initially, structured textual content, such as the exemplary webpage 110, can be provided to a leaf node extraction, such as the exemplary leaf node extraction 210. According to one aspect, the subsequent processing to generate the annotations focuses on leaf nodes, such as the exemplary leaf nodes 122 and 123 because such leaf nodes represent the textual content divided into an atomic level. Accordingly, the exemplary leaf node extraction 210 can traverse the VDOM 120 and, as part of the traversing, at each lowest hierarchical layer, extract the leaf nodes at that layer. In such a manner, the exemplary leaf node extraction 210 can extract the leaf nodes 211 from the VDOM 120. According to one aspect, the order of the extracted leaf nodes 211 is in accordance with their order in the VDOM 120, such that, for example, the leaf nodes adjacent to the leaf node 123 in the VDOM 120 can likewise be adjacent to the leaf node 123 in the sequence of the extracted leaf nodes 211.

Individual leaf nodes, of the leaf nodes 211, generated by the leaf node extraction 210, can be have individual vectors can for them, where the numerical values of the dimensions of the generated vectors are based upon various information extracted from, assigned to, or otherwise associated with the leaf nodes. One vector that can be generated for the leaf nodes in the sequence of extracted leaf nodes 211 can be a text vector whose values along any one or more dimensions can depend upon the textual content associated with a leaf node. Such a vector can be generated by the exemplary text vector generation 220. More specifically, according to one aspect, the semantical meaning of the textual content of a leaf node is translated into a multidimensional vector in accordance with known semantic text to vector mechanisms, such as FastText, Word2vec or GloVe. Thus, by way of a simple example, the semantic meaning behind the phrase "crying over spilled milk" and "water under the bridge" is very similar, despite the utilization of different terms. A conversion mechanism that converted text to multidimensional vectors based on semantic meaning might, by way of a simple example, convert the first phrase into a first multidimensional vector [392, 15, 67, 128, 852], if vectors of only five dimensions were being utilized, and might convert the second phrase into a second multidimensional vector [392, 15, 67, 127, 854] that identifies an endpoint that is proximate, in the multidimensional space, to the endpoint identified by the first vector.

According to another aspect, the textual content of a leaf node is translated into a multidimensional vector based upon the textual characters and/or their ordering utilizing a character-to-numerical value translation that is independent of the semantic meaning of the textual content. To return to the prior example, such a conversion mechanism might convert the phrases "crying over spilled milk" and "water under the bridge" to very different multidimensional vectors, signifying the different terminology utilized. By way of a simple example, such a character-to-numerical value conversion mechanism might convert the first phrase into a first multidimensional vector [521, 26, 101, 82, 733], if vectors of only five dimensions were being utilized, and might convert the second phrase into a second multidimensional vector [131, 547, 81, 40, 19] that identifies an endpoint that is quite distant, in the multidimensional space, from the endpoint identified by the first vector.

The resulting output vectors, such as the exemplary text vectors 221 can, comprise a single vector for each of the leaf nodes 211, with the dimensionality of the vector, illustrated as "d1" in the FIG. 2a being dependent upon the conversion mechanism utilized by the text vector generation 220. By way of one example, the dimensionality of the vectors 221 can be a hundred dimensions or more.

Returning back to the leaf nodes 211, in addition to being provided to the text vector generation 220, the leaf nodes 211 can also be provided to a visual features vector generation 230 that can generate multidimensional vectors for the leaf nodes 211 whose magnitudes along any one or more dimensions depend upon visual features associated with the textual content of a corresponding leaf node. Such visual features can include the font type, the font style, the specific typeface, the font size, any colors applied to one or more of the textual characters, the character spacing and other like typographic attributes of the textual content. Such visual features can also include the type of element, such as whether the leaf node comprises textual content that is part of a block element, an in-line element, or other like structured text elements. Visual features can also include stylesheet properties, such as line style, cursor style, line height, and other like structured text properties. Additionally, the visual position of the textual content of a corresponding leaf node, in a rendering of the webpage, can also be included as part of the visual features utilized to generate the vectors 231.

According to one aspect, each of the aforementioned visual features is associated with discrete one or more dimensions of the multidimensional vector. By way of a simple example, a first dimension of a visual features vector can be associated with a font style such as, for example, having a value of "1" for regular, "2" for bold, "3" for italic, "4" for underline, and so forth. Continuing such a simple example, a second dimension of a visual features vector can be associated with a typeface, such as, for example, having a value of "1" for Courier, "2" for Times New Roman, "3"

for Comic Sans, and so forth. A third dimension, continuing with the simple example, of a visual features vector can simply be a representation of the point size in numerical form, a fourth dimension could comprise numerical values of different colors, a fifth dimension could comprise numerical values of character spacing, a sixth dimension could comprise numerical values of line separation, and so forth. In such an example, a vector generated for a leaf node whose text was bold Times New Roman could be of the form [2, 2 . . . ] while a vector generated for leaf node whose text was italic Times New Roman could be of the form [3, 2, . . . ].

According to an alternative aspect, one or more visual features are amalgamated into the values assigned to one or more dimensions. Thus, for example, in such an aspect, a single dimensional value can represent bold Times New Roman font of twelve points in size, while a different value of the same single dimension can represent italic Comic Sans font of nine points in size. The output of the visual features vector generation 230 can be a set of factors, such as the exemplary set of vectors 231, comprising one vector for each of the leaf nodes in the set of leaf nodes 211, with the generated vector, from the set of vectors 231, having magnitudes along one or more dimensions dependent upon of the aforementioned visual features associated with the textual content of the leaf node corresponding to that vector. The dimensionality of the set of vectors 231, illustrated as "d2" in the FIG. 2a being dependent upon the conversion mechanism utilized by the visual features vector generation 230. The dimensionality of the vectors 231 can be the same as, or can differ from, the dimensionality of the vectors 221.

According to one aspect, the vectors 231, generated by the visual features vector generation 230, have magnitudes along one or more dimensions that are based upon the textual content itself of the corresponding leaf nodes, even though such textual content can have already been taken into account by the text vector generation 220, described previously. Such multiple consideration of the textual content can avoid dilution, providing vectors whose values are more directly based upon the textual content, in the form of the vectors 221, generated by the text vector generation 220, while also incorporating the textual content in the vectors 231, generated by the visual features vector generation 230.

In a similar manner, while, as indicated, the vectors 231, generated by the visual features vector generation 230, can have magnitudes along one or more dimensions that are based upon the visual position of the textual content of the corresponding leaf nodes, such visual positioning can also be, separately, further accounted for by position vectors generated by positional vector generation 240. According to one aspect, the dimensionality of the position vectors 241, generated by the positional vector generation 240, are a single dimension. In other words, a position vector can simply be a single numerical value representing an order, within the webpage 110, of the textual content of a leaf node corresponding to that position vector. According to this aspect, the position vectors 241 can comprise sequentially increasing numerical values if the leaf nodes 211 are ordered as described above. According to another aspect, however, the dimensionality of the position vectors 241, illustrated as "d3" in the FIG. 2a, can be two dimensions and can define, for example, a positional orientation of the textual content corresponding leaf node in a rendering of the webpage. According to still a further aspect, the dimensionality of the position vectors 241 can be three dimensions or higher and can encapsulate dimensional positioning in both relative and absolute senses.

The text vectors 221, visual features vectors 231 and positional vectors 241 can be amalgamated by a vector amalgamation 250 to generate the amalgamated vectors 251. According to one aspect, the vector amalgamation 250 amalgamates the vectors 221, 231 and 241 by concatenating corresponding ones of those sets of vectors together. Thus, for example, a first one of the amalgamated vectors 251, corresponding to a first one of the leaf nodes 211, can be generated by the vector amalgamation 250 by concatenating a first one of the positional vectors 241 onto an and of the first one of the visual features vectors 231, and then concatenating that combination on to an end of the first one of the text vectors 221. Other ordered concatenations among the first ones of the text vectors 221, the visual features vectors 231, and the positional vectors 241 can likewise be utilized. According to another aspect, the vector amalgamation 250 amalgamates the text vectors 221, the visual features vectors 231, and the positional vectors 241 by adding them together utilizing vector addition. For example, a first one of the amalgamated vectors 251, corresponding to a first one of the leaf nodes 211, can be generated by adding a first one of the positional vectors 241 to a first one of the visual features vectors 231, and to a first one of the text vectors 221 utilizing vector addition. Prior to performing the vector addition, if the dimensionality of the text vectors 221, nominated "d1", the visual features vectors 231, nominated "d2", and the positional vectors 241, nominated "d3", differs from one another, then one or more of the text vectors 221, the visual features vectors 231 and/or the positional vectors 241 can be up-converted, projected onto a higher dimension, or otherwise have their dimensionality increased to vectors having a dimensionality that is the highest from among the dimensionalities "d1", "d2" and "d3". If the vector amalgamation 250 concatenates the vectors, then the dimensionality of the amalgamated vectors 251, nominated "d4", can be equivalent to a some of the quantity of dimensions in "d1", "d2" and "d3". Conversely, if the vector amalgamation 250, performs vector addition, then the dimensionality of the amalgamated vectors 251, "d4", can be equivalent to a largest quantity of dimensions in "d1", "d2" or "d3".

Figure 2B:
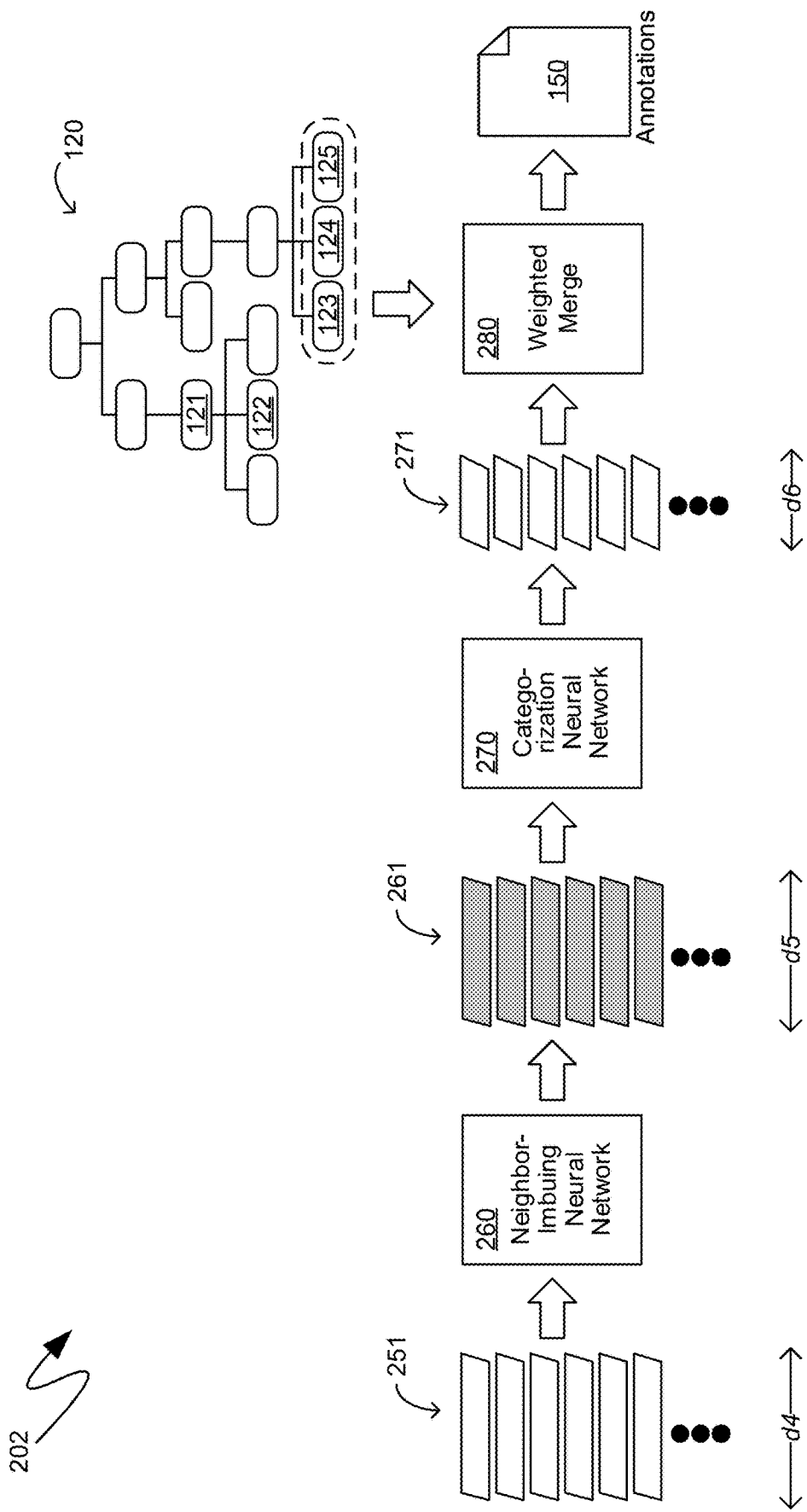

Turning to FIG. 2b, the exemplary system 202 shown therein illustrates an exemplary continuation of the system 201 shown in FIG. 2a and described in detail above. As illustrated by the exemplary system 202, the amalgamated vectors 251 can be provided to a neighbor-imbuing neural network 260. As will be detailed further below, the neighbor-imbuing neural network 260 can utilize a set of weight values, automatically derived through a training process, which will also be detailed further below, to imbue information into the vectors from neighboring vectors, representing neighboring leaf nodes, thereby generating enhanced vectors 261 whose values are affected by neighboring information. In such a manner, information relevant to one portion of the structured textual content can meaningfully impact the information derived from other portions of the structured textual content, thereby improving the ultimate categorization. According to one aspect, the numeric information represented by the amalgamated vectors 251 is provided to the neighbor-imbuing neural network 260 in the form of a matrix of numerical values, with the height of the matrix dimensionally represented by a quantity of leaf nodes and, thus, a quantity of individual vectors of the amalgamated vectors 251, and a width of the matrix dimensionally represented by a quantity of the dimensionality of each of the amalgamated vectors 251.

The enhanced vectors 261 generated by the neighbor-imbuing neural network 260 can have a dimensionality, denoted "d5" in FIG. 2b, that can be equal to the dimensionality "d4" of the amalgamated vectors 251. Alternatively, the dimensionality "d5" can be greater than, or less than, the dimensionality "d4". The enhanced vectors 261 can then be provided as input to a subsequent neural network, namely the categorization neural network 270. As with the neighbor-imbuing neural network 260, the operation of the categorization neural network 270 will be detailed further below, but entails the utilization of another set of weight values, which are also automatically derived through a training process, detailed further below, to generate the categorization vectors 271. As with the amalgamated vectors 251, provided as input to the neighbor-imbuing neural network 260, the enhanced vectors 261 can be provided to the categorization neural network 270 also in the form of a matrix of numerical values, with the height of the matrix dimensionally represented by a quantity of leaf nodes and, thus, a quantity of individual vectors of the enhanced vectors 261, and a width of the matrix dimensionally represented by a quantity of the dimensionality of each of the enhanced vectors 261.

According to one aspect, the categorization vectors 271 output by the categorization neural network 270 represent a categorization of the textual content of the leaf nodes corresponding to the categorization vectors 271. For example, each dimension of the categorization vectors 271 can correspond to a specific category, and the numerical value, in a specific vector, associated with a particular dimension can represent a categorization of the textual content of the leaf node corresponding to that categorization vector. Thus, for example, if there are five categories into which textual content may be categorized, then the dimensionality of the categorization vectors 271, denoted "d6" in FIG. 2b, can be five. A categorization of textual content into the first category can, for example, be of the form [1, 0, 0, 0, 0], with each dimension represented with a binary value signifying either a categorization, or not, of the textual content into the corresponding category. Alternatively, a categorization of textual content into the first category can, for example, be of the form [0.7, 0.0, 0.2, 0.1, 0.0], where the fractional values assigned to the individual dimensions sum to a value of "one" and a categorization can be determined based on a largest fractional value, or based on any fractional value exceeding a predetermined threshold. Alternatively, a categorization of the textual content in the first category can be of the form [92, 12, 58, 6, 32], where fractional values are not utilized, nor do the values sum to a predetermined amount. Again, a categorization can be determined based on a largest value, or based on any values exceeding a predetermined threshold. According to one aspect, textual content is concurrently categorized into two or more categories. Thus, for example, if a threshold of 50 was utilized, the exemplary categorization vector [92, 12, 58, 6, 32] utilized previously can represent a categorization of textual content into both the first category and the third category. Additionally, disparities in value can be utilized to weight the categorizations such that the categorization of the textual content in the first category is more certain, or carries a higher weight, than the categorization of the textual content to the third category.

Various different categorizations can be assigned to the textual content. According to one aspect, textual content is categorized as one or more of: heading content, header content, footer content, list content, aside content, table content and/or primary content. Thus, one example of textual content being assigned to multiple categories is assigning of textual content as both list content and primary content. In the example presented above of a web forum, a list that a user posted as a part of their forum post could be categorized as both list content and primary content.

In some instances, what the user may perceive as a single piece of textual content, such as, for example, a single sentence, can be comprised of textual content that is split across multiple leaf nodes. The VDOM 120 comprises relevant information from which such associated multiple leaf nodes, each comprising portions of textual content that is to be considered together, can be obtained. For example, the VDOM 120 can include nodes from which the beginning and end of a paragraph can be delineated. As another example, parent nodes can be utilized to identify related textual content. For example, as illustrated by the exemplary VDOM 120 shown in FIG. 2b, the exemplary leaf nodes 123, 124 and 125 can each comprise portions of textual content that would be understood by a human as a single, undivided whole, such as portions of a single sentence.

In instances where multiple different leaf nodes each comprise a portion of textual content that is best categorized as a whole, a weighted merge of two or more categorization vectors, from among the categorization vectors 271, can be performed, such as by the weighted merge 280. More specifically, the vectors, from among the categorization vectors 271, corresponding to the leaf nodes 123, 124 and 125, can be added together, such as by vector addition. According to one aspect, each of the vectors is weighted in accordance with a proportion of the overall textual content associated with the leaf nodes 123, 124 and 125, that each individual leaf node comprises. Thus, for example, if a single sentence was ten words long, and the leaf node 123 comprised three of those words, the leaf node 124 comprised one of those words, and the leaf node 125 comprised six of those words, then the weight assigned to the categorization vector associated with the leaf node 125 can be twice the weight assigned to the categorization vector associated with the leaf node 123 and six times the weight assigned to the categorization vector associated with the leaf node 124. The categorization applied to the textual content associated with the leaf node 123 can then be the same as the categorization applied to the textual content associated with the leaf nodes 124 and 125, and can be based on the weighted merging of the categorization vectors, from among the categorization vectors 271, corresponding to the leaf nodes 123, 124 and 125, such as in the manner detailed.

The categorization of textual content, such as from the corresponding categorization vectors 271, can be encapsulated in annotations, such as the exemplary annotations 150. According to one aspect, textual content is categorized by identifying a beginning and an end of a categorized textual content, as well as a categorization assigned to such textual content. Such beginnings and ends can be identified based on offset values, such as from a beginning of a webpage file. The annotations 150 can then be utilized for further downstream processing. For example, a search engine may seek to index only the primary content, such as of a web forum comprising user-authored posts, and exclude from indexing repetitive or immaterial information, such as navigation bars, advertisements, and the like. Such a search engine can then utilize the annotations 150, to identify those portions of a website, such as the exemplary website 110 illustrated in FIG. 1, that have been classified as primary content, and then filter out the remaining portions, retaining only those portions that have been classified as primary content and indexing such portions. As another example, a website analysis service may seek to analyze webpages based on a proportion of textual content classified as primary content to textual content classified as other categories, such as, for example, header and/or footer. Again, the annotations 150 can be utilized identify those portions of the exemplary website 110, illustrated in FIG. 1, that have been categorized with those categories.

Figure 3:
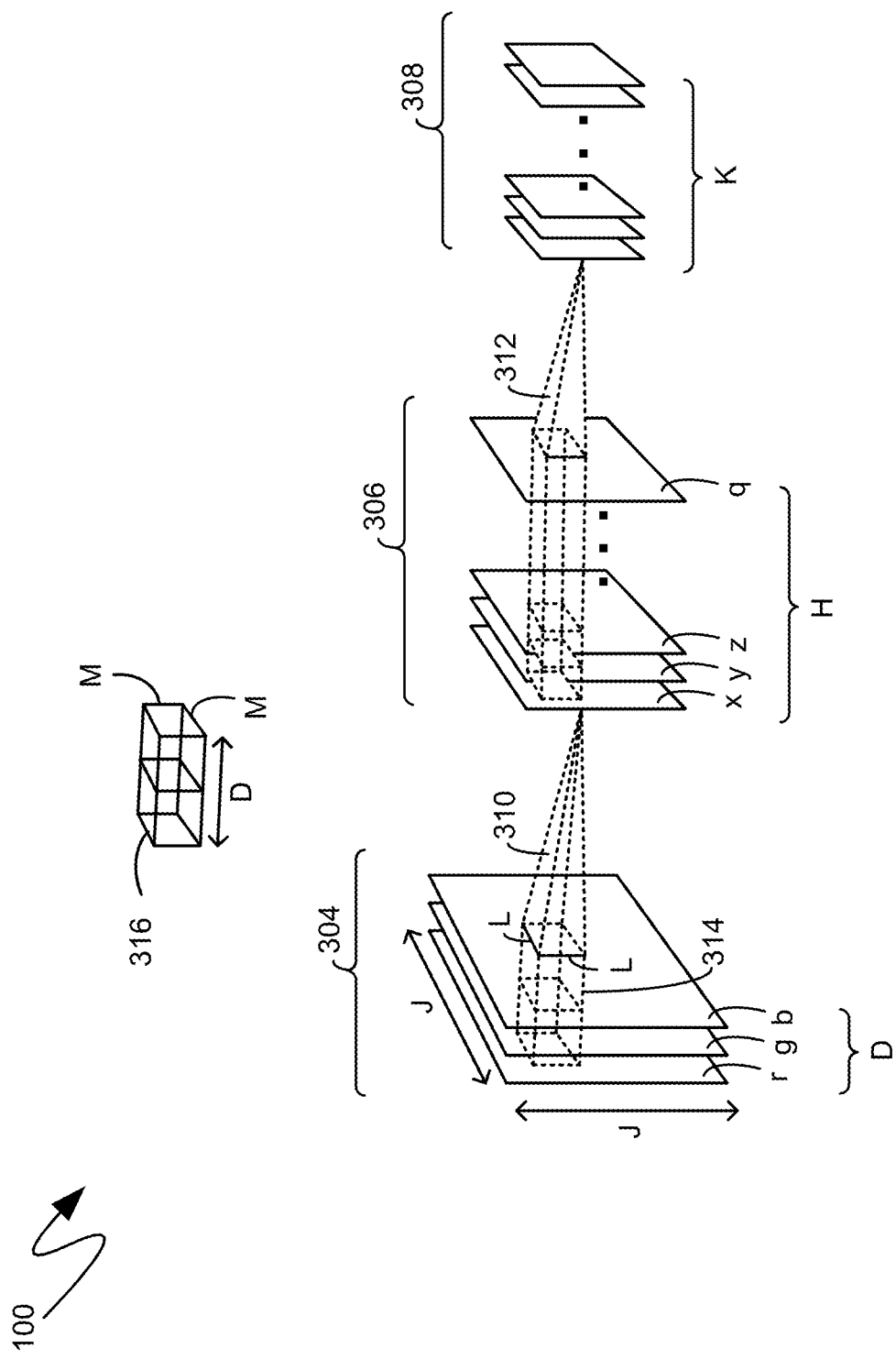
FIG. 3 is a system diagram of an example of convolution performed by a neural network.

Turning now to the operation of the neighbor-imbuing neural network 260 and the categorization neural network 270, neural networks, including deep neural networks (DNNs) and convolution neural networks (CNNs), can achieve high accuracy on human recognition tasks such as image and speech recognition. Neural networks may include a number of different processing "layers", including dense, or fully-connected, layers, convolutional layers, pooling layers, normalization layers, and the like. Outputs of convolutional layers may be processed with pooling layers, which subsample the convolved output, and can be further processed with activation functions, which are typically nonlinear functions, such as sigmoid or tan h. FIG. 3 is a simplified diagram depicting a three-dimensional (3D) CNN 300 that includes three exemplary 3D volumes, namely the exemplary volumes 304, 306, 308. Each 3D volume 304, 306, 308 can represent an input to a layer, and can be transformed into a new 3D volume that feeds a subsequent layer. In the example of FIG. 3, there are two convolutional layers, namely the exemplary convolution layers 310 and 312. Volume 304, with 3 planes, can be an input to convolutional layer 310, which can generate volume 306, with H planes, which, in turn, can be an input to convolutional layer 312, which can generate volume 308, with K planes.

For example, volume 304 can include image data in three planes, such as the well-known "red", "green" and "blue" layers of a color image. Each plane can include a two-dimensional array of data. For example, if the exemplary volume 304 was a portion of an image, then the portion could be, for example, one-hundred pixels wide by one-hundred pixels high. In such an instant, the variable "J", shown in FIG. 3, can be a value of one hundred. More or fewer than three planes may be used, and each plane need not include a square array. Additionally, data other than image data may be used.

A 3D input volume, such as the exemplary input volume 314, can be convolved with weight kernels. For example, as shown in FIG. 3, the exemplary input volume 314 can be of dimensions L×L×D, where D is three in the present example. Such an exemplary input volume can be convolved with kernel weights, such as the exemplary kernel weights 316, which can also have a dimension of L×L×D, with, again, the dimension D being three in the present example. Each kernel weight can shifted in a sliding-window-like fashion across the input volume, such as the exemplary volume 304. A stride value can define an amount of such a shift offset. During each shift, each weight in to the 3D kernel weight is multiplied and added with corresponding pair-wise input elements from the overlapping region of input volume 314.

Figure 4A:
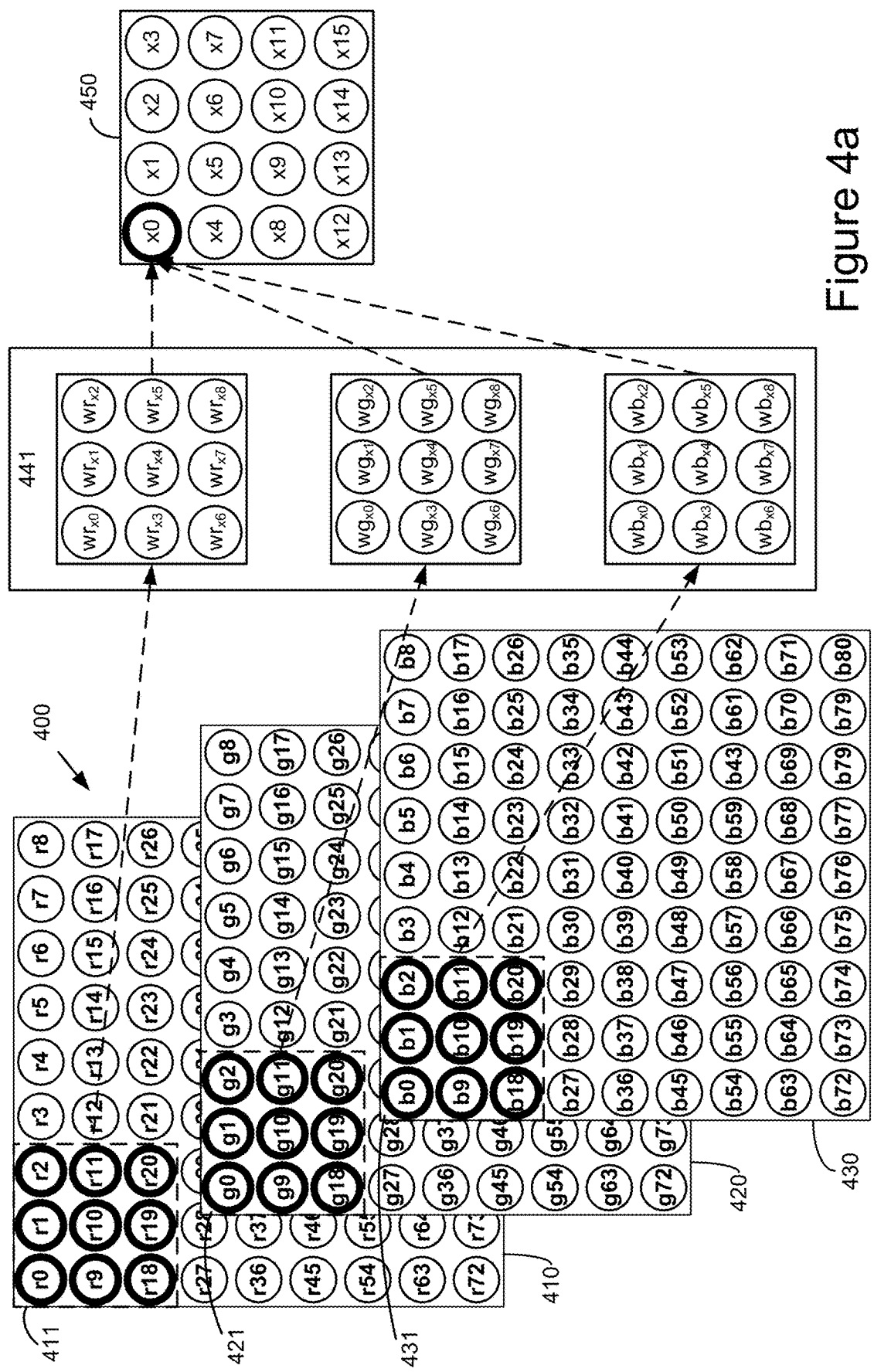
FIGS. 4a-4d are block diagrams of portions of an example of convolution performed by a neural network.
Figure 4B:
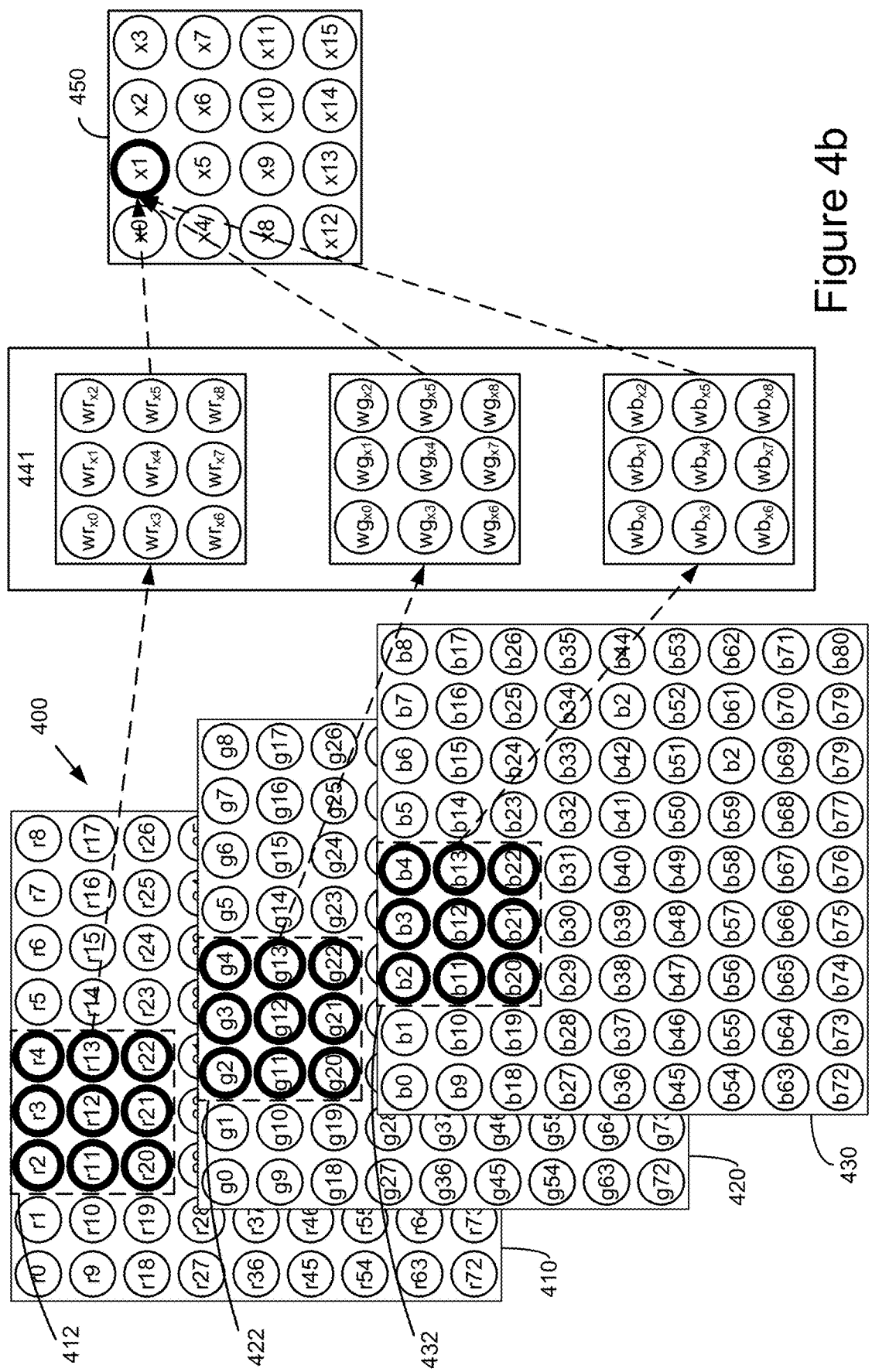
Figure 4C:
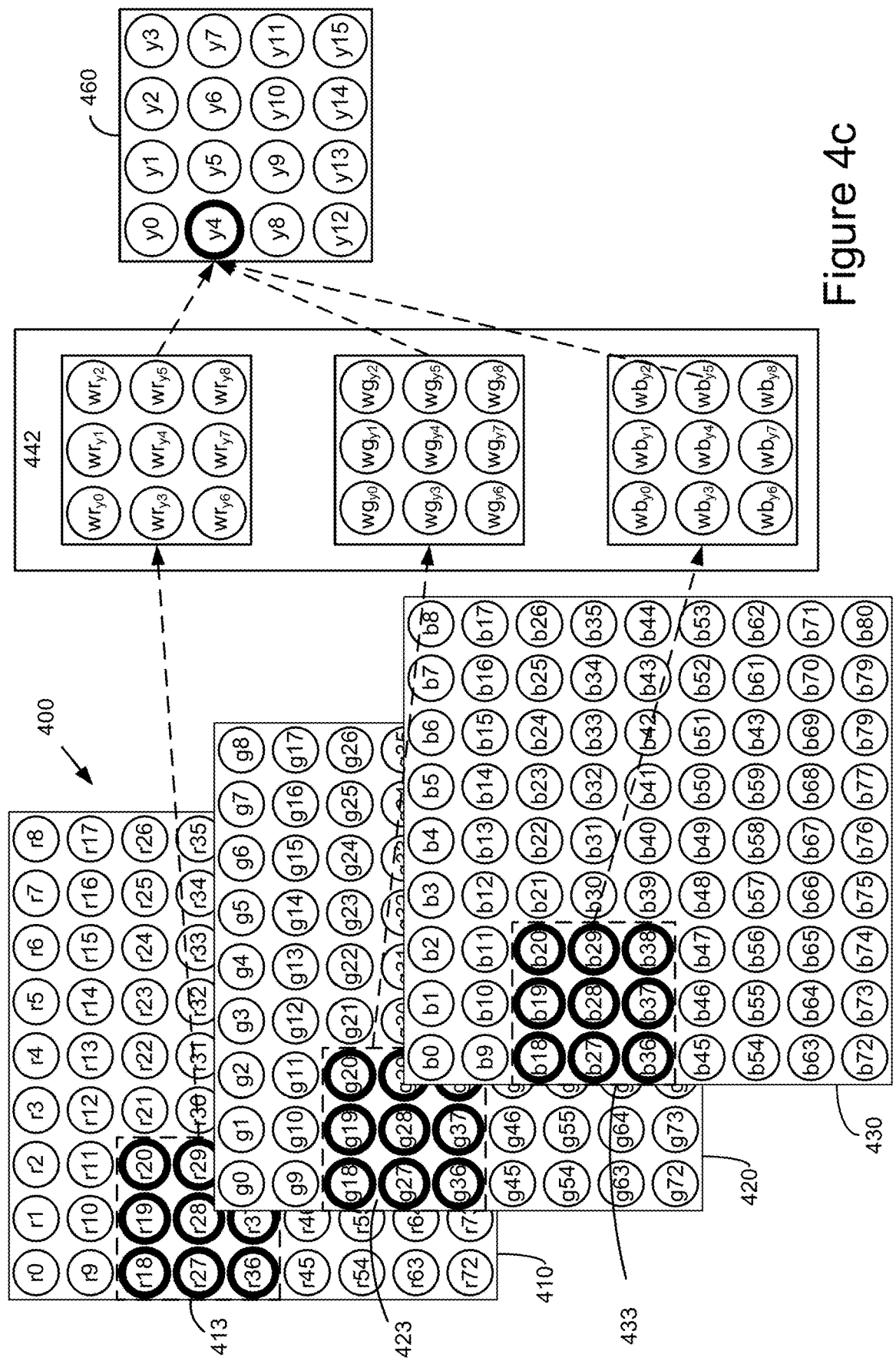
Figure 4D:
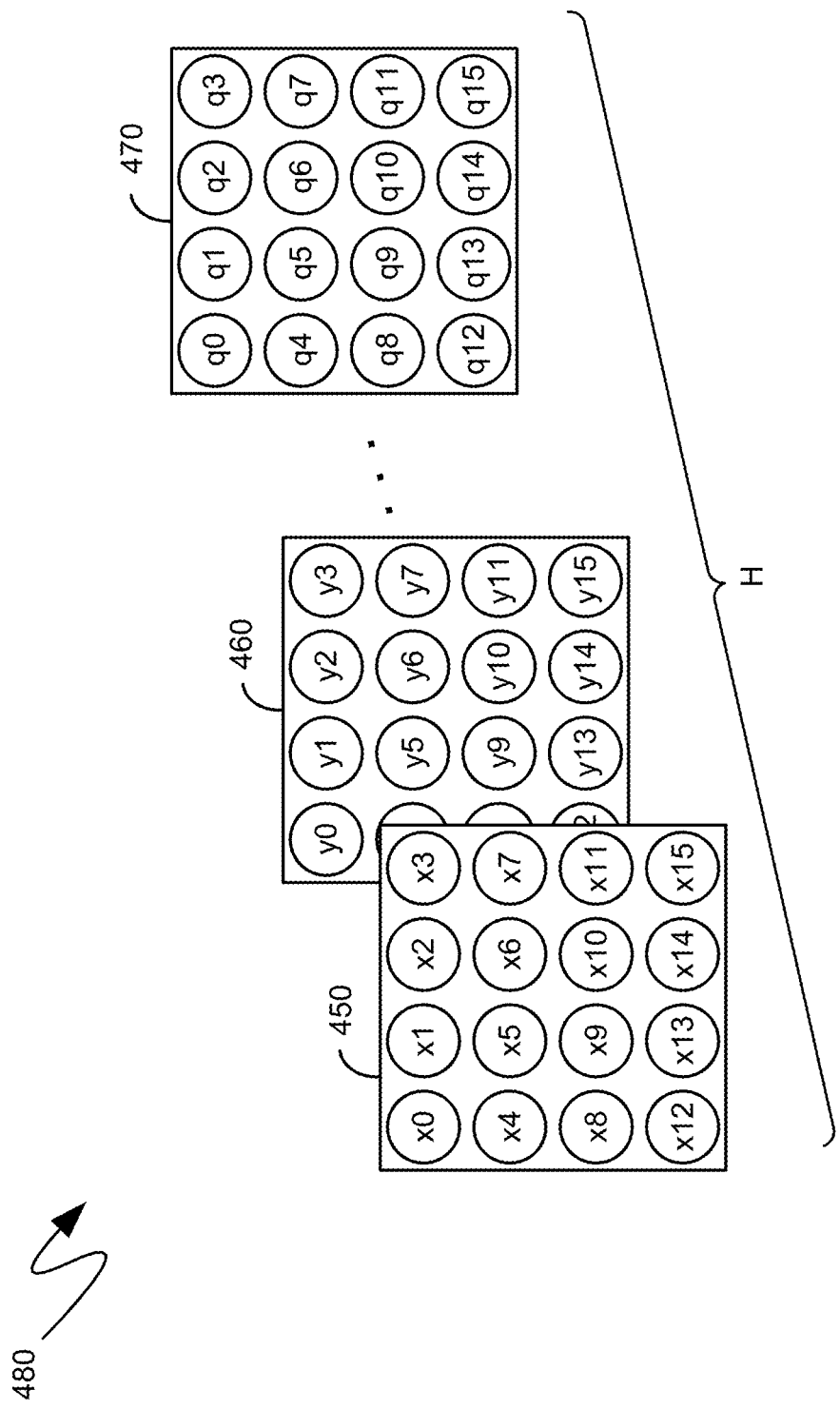

Such a process is illustrated in greater detail in FIGS. 4a-4d. More specifically, FIG. 4a shows an exemplary convolution of a volume, namely the exemplary volume 400, with a set of kernel weights, namely the exemplary kernel weights 441, to generate a first plane 450 of a second volume 480, that is shown in FIG. 4d. The exemplary first volume 400 can comprise three planes, namely the three exemplary planes 410, 420 and 430, with a nine-by-nine array of image data, for example. As indicated above, in the context of image data, the three exemplary planes can comprise a single plane of each of the colors red, green and blue. Each of a first set of kernel weights 441 can have an exemplary dimensionality of three-by-three-by-three.

As illustrated in FIG. 4a, data value x0 of an exemplary first plane 450 of the exemplary second volume 480 can be determined by multiplying every weight in the first set of kernel weights 441 with every pair-wise input element from the overlapping region of a first input volume, such as the overlapping regions 411, 421 and 431. According to one aspect, the data value x0 can be expressed as follows:

$$x0 = \begin{pmatrix} r0 & r1 & r2 \\ r9 & r10 & r11 \\ r18 & r19 & r20 \end{pmatrix} \begin{pmatrix} wr_{x0} & wr_{x3} & wr_{x6} \\ wr_{x1} & wr_{x4} & wr_{x7} \\ wr_{x2} & wr_{x5} & wr_{x8} \end{pmatrix} +$$

$$\begin{pmatrix} g0 & g1 & g2 \\ g9 & g10 & g11 \\ g18 & g19 & g20 \end{pmatrix} \begin{pmatrix} wg_{x1} & wg_{x3} & wg_{x6} \\ wg_{x1} & wg_{x4} & wg_{x7} \\ wg_{x2} & wg_{x5} & wg_{x8} \end{pmatrix} +$$

$$\begin{pmatrix} b0 & b1 & b2 \\ b9 & b10 & b11 \\ b18 & b19 & b20 \end{pmatrix} \begin{pmatrix} wb_{x1} & wb_{x3} & wb_{x6} \\ wb_{x1} & wr_{x4} & wb_{x7} \\ wb_{x2} & wb_{x5} & wb_{x8} \end{pmatrix}$$

First set of kernel weights 441 can then slide by a quantity of horizontal data values of first volume 400 determined by the stride value. FIG. 4b illustrates a stride value of two. Thus, as illustrated in FIG. 4b, data value x1 of the exemplary first plane 450 of the exemplary second volume 480 can determined by multiplying every weight in the first set of kernel weights 441 with every pair-wise input element from a slid overlapping region of a second input volume, such as the exemplary slid overlapping region 412, 422 and 432. According to one aspect, the data value x1 can be expressed as follows:

$$x1 = \begin{pmatrix} r2 & r3 & r4 \\ r11 & r12 & r13 \\ r20 & r21 & r22 \end{pmatrix} \begin{pmatrix} wr_{x0} & wr_{x3} & wr_{x6} \\ wr_{x1} & wr_{x4} & wr_{x7} \\ wr_{x2} & wr_{x5} & wr_{x8} \end{pmatrix} +$$

$$\begin{pmatrix} g2 & g3 & g4 \\ g11 & g12 & g13 \\ g20 & g21 & g22 \end{pmatrix} \begin{pmatrix} wg_{x1} & wg_{x3} & wg_{x6} \\ wg_{x1} & wg_{x4} & wg_{x7} \\ wg_{x2} & wg_{x5} & wg_{x8} \end{pmatrix} +$$

$$\begin{pmatrix} b0 & b1 & b2 \\ b11 & b12 & b13 \\ b20 & b21 & b22 \end{pmatrix} \begin{pmatrix} wb_{x1} & wb_{x3} & wb_{x6} \\ wb_{x1} & wr_{x4} & wb_{x7} \\ wb_{x2} & wb_{x5} & wb_{x8} \end{pmatrix}$$

Such a process can continue, with the first set of kernel weights 441 sliding two horizontal values, in the illustrated example, of the exemplary first volume 400, with each iteration, until the first row of data values (x0, x1, x3, x3) of first plane 450 is complete. The first set of kernel weights 441 can then slide down, for example, two rows and back to the leftmost column of first volume 400 to calculate the second row of data values (x4, x5, x6, x7) of first plane 450. This process can continue until all four rows of data values of the first plane 450 are complete.

As illustrated in FIG. 4c, the exemplary data value y4 of the exemplary second plane 460 of second volume 408 can be determined by multiplying every weight in the second set of kernel weights 442 with every pair-wise input element from the down-slid overlapping region 413, 423 and 433. According to one aspect, the data value y4 can be expressed as follows:

$$y4 = \begin{pmatrix} r18 & r19 & r20 \\ r27 & r28 & r29 \\ r36 & r37 & r38 \end{pmatrix} \begin{pmatrix} wr_{y0} & wr_{y3} & wr_{y6} \\ wr_{y1} & wr_{y4} & wr_{y7} \\ wr_{y2} & wr_{y5} & wr_{y8} \end{pmatrix} +$$

$$\begin{pmatrix} g18 & g19 & g20 \\ g27 & g28 & g29 \\ g36 & g37 & g38 \end{pmatrix} \begin{pmatrix} wg_{y1} & wg_{y3} & wg_{y6} \\ wg_{y1} & wg_{y4} & wg_{y7} \\ wg_{y2} & wg_{y5} & wg_{y8} \end{pmatrix} +$$

$$\begin{pmatrix} b18 & b19 & b20 \\ b27 & b28 & b29 \\ b36 & b37 & b38 \end{pmatrix} \begin{pmatrix} wb_{y1} & wb_{y3} & wb_{y6} \\ wb_{y1} & wr_{y4} & wb_{y7} \\ wb_{y2} & wb_{y5} & wb_{y8} \end{pmatrix}$$

Such a process can continue until all data values of second plane 460 of second volume 480 are complete, and also continues for each of the H weight volumes to generate the H planes in of second volume 480. Referring again to FIG. 3, volume 306, determined such as in the manner illustrated by FIGS. 4a-4d, and detailed above, then becomes an input layer to convolutional layer 312, which can include K weight volumes to generate the K planes of volume 308.

According to one aspect, the values of the weights utilized in the convolutions detailed above can be derived as part of the "training" of a neural network. Typically, such training starts with initial weight values proceeds iteratively, where, for each iteration, the weight values are modified in accordance with information, such as gradient information, obtained during the processing of a prior iteration. As such, the training typically entails the performance of so-called "forward" processing, or forward propagation, and "backwards" processing, or backpropagation. More specifically, forward propagation of one or more input activations through the neural network can be utilized to generate output activations, which can be prediction. Then, gradients can be determined for each of the neurons in the neural network via back-propagation of "errors" from the output layer back to the input layer. Such gradients can then be utilized to update the weights at each neuron. Repetition of such processes can continue until the weights converge.

In gradient descent, several choices can be available for selecting a number of inputs to use per iteration. A first method, batch gradient descent, can utilize all available training data, such as, for example, pre-labeled images, in each iteration between weight updates. This method can be very expensive. A second method, stochastic gradient descent, can represent another extreme by selecting one random example from the corpus between weight updates. A third method, mini-batch gradient descent, can use a random subset of the corpus to perform gradient computation, followed by a single weight update.

In practice, mini-batch gradient descent can often be a good balance between training accuracy and training time. Furthermore, mini-batching can facilitate implementation of available parallelism in hardware, by allowing gradients for different inputs to be computed in parallel (without a serial dependence on weight updates). The remainder of this description will assume mini-batch gradient descent for training.

For purposes of training the neural networks, such as the exemplary neighbor-imbuing neural network 260 and the categorization neural network 270, both such neural networks can be trained simultaneously, and the weights of their weight matrices can be established at the same time. More specifically, multiple training webpages can be provided, from which leaf node information can be extracted, and corresponding vectors generated, such as in the manner detailed above. Such vectors can then be input, first into the neighbor-imbuing neural network 260, and then the output of the neighbor-imbuing neural network 260 being provided to the categorization neural network 270, and the resulting output vectors 271 can be compared with known correct categorizations. An iterative process, such as detailed above can then adjust the weight values utilized by both the neighbor-imbuing neural network 260 and the categorization network 270 to achieve the known correct categorizations.

Figure 5:
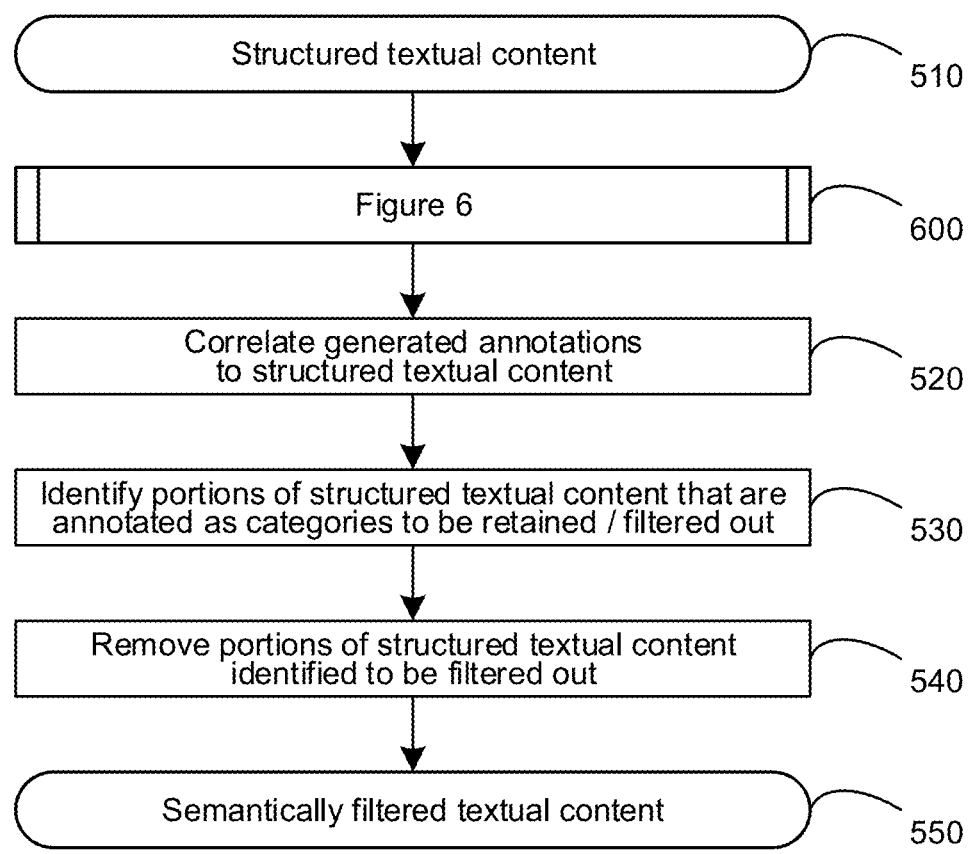
FIG. 5 is a flow diagram of an example of generation of a semantically filtered structured textual content.

Turning to FIG. 5, the exemplary flow diagram 500 shown therein illustrates an exemplary series of steps by which semantically filtered textual content can be generated from structured textual content. Initially, as illustrated by step 510, structured textual content, such as a webpage, can be received as input. Subsequently the steps of the flow diagram 600, shown in FIG. 6, can be performed to generate annotations of the structured textual content, identifying categorizations assigned by the performance of such steps to the portions of the structure textual content identified by those annotations. At step 520 a correlation can be performed between the annotations generated by the steps of the exemplary flow diagram 600, and the textual content itself, such as obtained from the structured textual content received at step 510. The portions of the structured textual content that are desirable, the portions of the structured textual content that are not desirable, or combinations thereof can be identified in step 530. Subsequently, at step 540, the portions of the textual content determined to be undesirable, based on the categorization assigned to such portions by the annotations, can be removed, ignored, skipped over, or otherwise filtered out. The remaining content, at step 550, is the semantically filtered textual content. As described above, the semantically filtered textual content can be used in tasks such as search index construction, keyword association and document evaluation.

Figure 6:
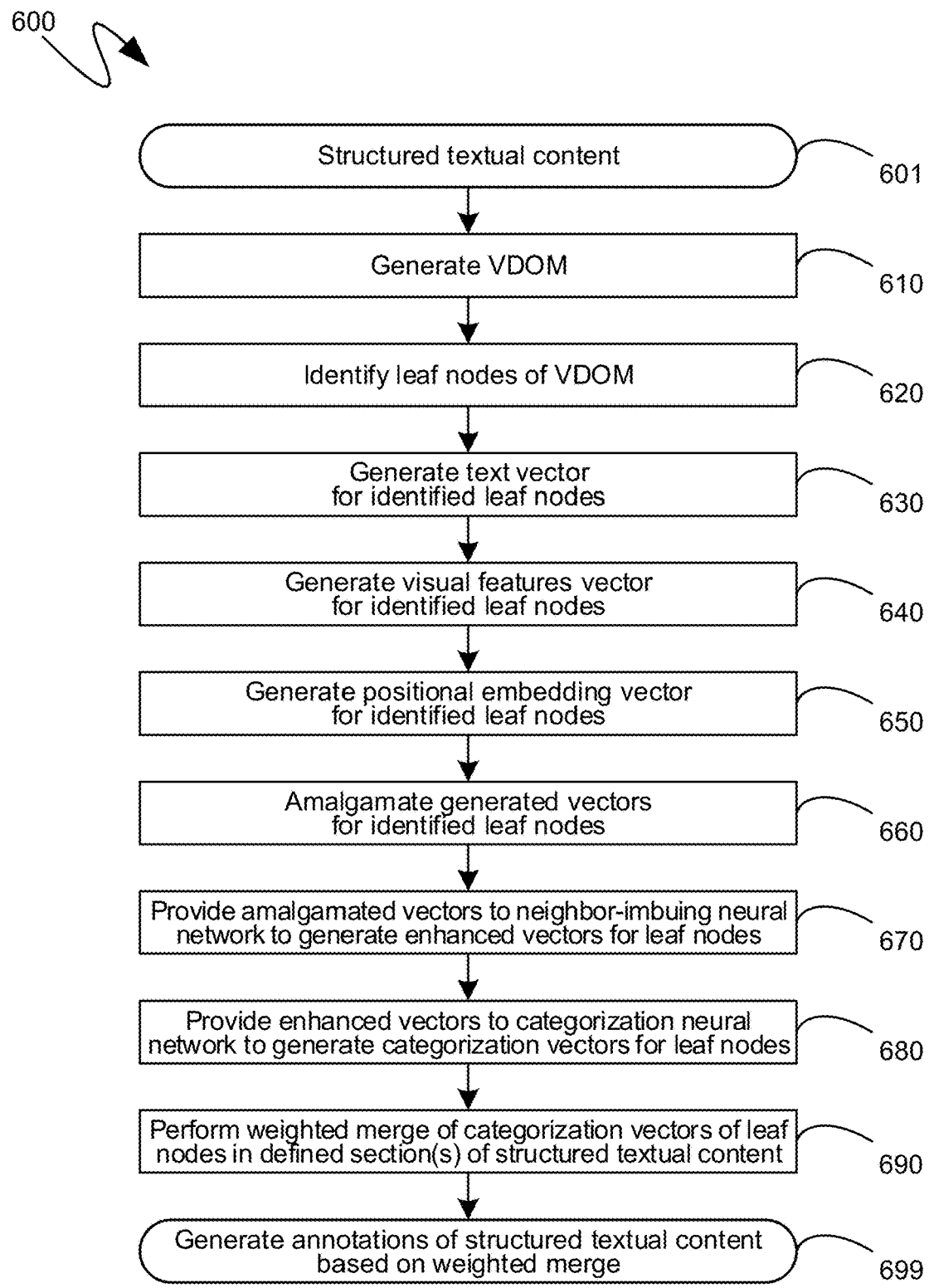
FIG. 6 is a flow diagram of an example of categorization of structured textual content.

Turning to FIG. 6, the exemplary flow diagram 600 shown therein illustrates an exemplary series of steps by which an annotation, identifying portions of structured textual content as being categorized as one or more categories, can be generated. Initially, at step 601, the structured textual content can be obtained, such as was illustrated in the exemplary flow diagram 500 shown in FIG. 5. Subsequently, at step 610, a VDOM, such as that detailed above, can be generated. At step 620, the VDOM can be traversed to identify the leaf nodes, and, at step 630 text vectors can be generated for the identified leaf nodes. More specifically, and as detailed above, the textual content associated with individual leaf nodes identified at step 620 can be utilized to generate a multidimensional vector corresponding to such textual content, including semantically, on a character basis, or otherwise. At step 640, visual features vectors can be generated for the leaf nodes identified at step 620. As detailed above, the visual features vectors can comprise multidimensional vectors whose value is based on visual features and attributes of the rendering of the text of a corresponding leaf node. At step 650, a positional embedding vector can be generated for individual ones of the leaf nodes identified at step 620. As indicated previously, such a positional embedding vector can be as simple as a one-dimensional value representing a sequencing order of the textual content of a corresponding leaf node within the overall textual content, such as obtained in step 601. Although illustrated as sequential steps, steps 630, 640 and 650 can be performed in parallel, or in any order after the identification of the leaf nodes at step 620 and prior to the generation of the amalgamated vectors at step 660.

At step 660, according to one aspect, the vectors generated at steps 630, 640 and 650 are amalgamated into a single vector, with each single amalgamated vector corresponding to a specific one of the individual leaf nodes identified at step 620. As indicated previously, such an amalgamation can comprise concatenation, vector addition, or other like amalgamation. At step 670, the vectors generated by step 660 can be provided to a neighbor-imbuing neural network to generate enhanced vectors. Again, as detailed above, each of the enhanced vectors can comprise a multidimensional vector corresponding to a specific one of the leaf nodes identified at step 620. At step 680, the output of step 670 can be provided to a categorization neural network which, as detailed above, can generate categorization vectors for the leaf nodes identified at step 620. According to one aspect, the dimensionality of the categorization vectors correspond to a quantity of different categorizations into which textual content can be categorized. In instances where leaf nodes correspond to only sub-portions of textual content that is to be categorized as a whole, two or more categorization vectors, corresponding to two or more leaf nodes, can be merged into a single categorization vector applicable to the textual content of the two or more leaf nodes. Such a merge can include a weighted vector addition, with a weight being applied to individual categorization vectors correlated to the proportion provided by the textual content associated with a single one of the leaf nodes as compared with the textual content being categorized as a whole. The categorization of textual content can then be performed in accordance with the categorization vectors generated at step 680, or the weighted merge of the categorization vectors performed at step 690. The corresponding annotations, identifying the textual content and the categorization assigned to it can be generated at step 699.

Although not required, the descriptions provided are meant to be understood in the general context of computer-executable instructions, such as program modules, being executed by a computing device. More specifically, the descriptions reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 7:
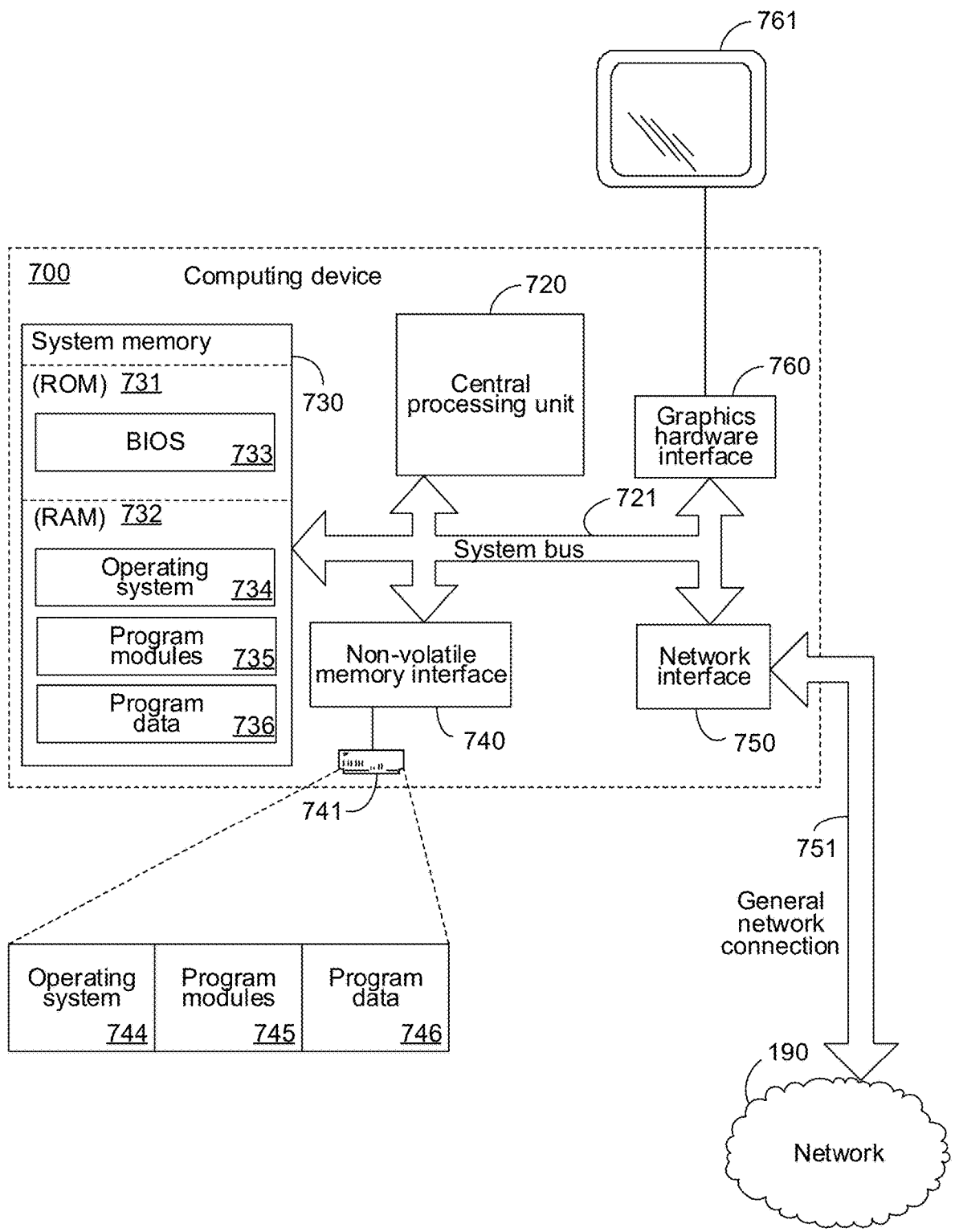
FIG. 7 is a block diagram of an example of a computing device.

Turning to FIG. 7, an exemplary computing device 700 is illustrated which can perform some or all of the mechanisms and actions described above. The exemplary computing device 700 includes, but is not limited to, one or more central processing units (CPUs) 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. The computing device 700 can optionally include graphics hardware, including, but not limited to, a graphics hardware interface 760 and a display device 761, which includes display devices capable of receiving touch-based user input, such as a touch-sensitive, or multi-touch capable, display device. Depending on the specific physical implementation, one or more of the CPUs 720, the system memory 730 and other components of the computing device 700 can be physically co-located, such as on a single chip. In such a case, some or all of the system bus 721 can be nothing more than silicon pathways within a single chip structure and its illustration in FIG. 7 can be nothing more than notational convenience for the purpose of illustration.

The computing device 700 also typically includes computer readable media, which includes any available media that can be accessed by computing device 700 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 700. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer content between elements within computing device 700, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, other program modules 735, and program data 736.

The computing device 700 may also include other removable/non-removable, volatile/nonvolatile computer storage media. By way of example only, FIG. 7 illustrates a hard disk drive 741 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 741 is typically connected to the system bus 721 through a non-volatile memory interface such as interface 740.

The drives and their associated computer storage media discussed above and illustrated in FIG. 7, provide storage of computer readable instructions, data structures, program modules and other data for the computing device 700. In FIG. 7, for example, hard disk drive 741 is illustrated as storing operating system 744, other program modules 745, and program data 746. Note that these components can either be the same as or different from operating system 734, other program modules 735 and program data 736. Operating system 744, other program modules 745 and program data 746 are given different numbers hereto illustrate that, at a minimum, they are different copies.

The computing device 700 may operate in a networked environment using logical connections to one or more remote computers. The computing device 700 is illustrated as being connected to the general network connection 751 (to a network 752) through a network interface or adapter 750, which is, in turn, connected to the system bus 721. In a networked environment, program modules depicted relative to the computing device 700, or portions or peripherals thereof, may be stored in the memory of one or more other computing devices that are communicatively coupled to the computing device 700 through the general network connection 771. It will be appreciated that the network connections shown are exemplary and other means of establishing a communications link between computing devices may be used.

Although described as a single physical device, the exemplary computing device 700 can be a virtual computing device, in which case the functionality of the above-described physical components, such as the CPU 720, the system memory 730, the network interface 760, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 700 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a method of improving automated structured textual content categorization accuracy, the method comprising: providing a first ordered sequence of vectors (e.g. 251, FIG. 2*a*) to a first neural network (e.g. 260, FIG. 2*b*), each vector in the first ordered sequence of vectors corresponding to a discrete portion of an overall structured textual content (e.g. 110, FIG. 1), the vectors of the first ordered sequence of vectors being ordered based on positioning of corresponding discrete portions of the structured textual content within the overall structured textual content; providing a second ordered sequence of vectors (e.g. 261, FIG. 2*b*) to a second neural network (e.g. 270, FIG. 2*b*), each vector in the second ordered sequence of vectors corresponding to a same discrete portion of the overall structured textual content as a corresponding vector from the first ordered sequence of vectors, the first neural network incorporating information from neighboring vectors of the first ordered sequence of vectors into each vector in the second ordered sequence of vectors; and categorizing portions of the overall structured textual content in accordance with dimensional values of a third ordered sequence of vectors (e.g. 271, FIG. 2*b*) output by the second neural network, each dimension of the vectors of the third ordered sequence of vectors corresponding to a category.

A second example is the method of the first example, further comprising: generating a document object model representation (e.g. 120, FIG. 1) of the overall structured textual content; wherein the discrete portions of the structured textual content, which correspond to the vectors of the first ordered sequence of vectors, are delineated by discrete leaf nodes (e.g. 122, 123, 124 and/or 125, FIG. 2*b*) of the generated document object model representation.

A third example is the method of the first or second example, wherein the vectors in the first ordered sequence of vectors comprise dimensional values representing visual features applied to the corresponding discrete portions of the structured textual content when the overall structured textual content is rendered for display.

A fourth example is the method of the third example, wherein the dimensional values representing the visual features comprise dimensional values set based on a font associated with the corresponding discrete portions of the structured textual content.

A fifth example is the method of the third or fourth example, wherein the dimensional values representing the visual features comprise dimensional values set based on an HTML element type associated with the corresponding discrete portions of the structured textual content.

A sixth example is the method of the third, fourth or fifth example, wherein the dimensional values representing the visual features comprise dimensional values based on a style sheet associated with the corresponding discrete portions of the structured textual content.

A seventh example is the method of the third, fourth, fifth or sixth example, wherein the vectors in the first ordered sequence of vectors further comprise dimensional values representing text of the corresponding discrete portions of the structured textual content.

An eighth example is the method of the seventh example, wherein the dimensional values are based on semantic meanings of the text of the corresponding discrete portions of the structured textual content.

A ninth example is the method of the seventh or eighth example, further comprising: generating a sequence of visual features vectors (e.g. 231, FIG. 2*a*), each visual feature vector comprising dimensional values representing the visual features applied to the corresponding discrete portions of the structured textual content when the overall structured textual content is rendered for display; generating a sequence of text vectors (e.g. 221, FIG. 2*a*), each text vector comprising dimensional values representing the text of the corresponding discrete portions of the structured textual content; and generating the vectors of the first ordered sequence of vectors by amalgamating a visual feature vector, from the sequence of visual features vectors, and a text vector, from the sequence of text vectors.

A tenth example is the method of the ninth example, further comprising: projecting the text vectors of the sequence of text vectors to higher dimensional text vectors; and projecting the visual features vectors of the sequence of visual features vectors to higher dimensional visual features vectors; wherein the amalgamating comprises vector adding the higher dimensional text vectors to the higher dimensional visual features vectors.

An eleventh example is the method of the seventh, eighth, ninth or tenth examples, wherein the dimensional values representing the visual features applied to the corresponding discrete portions of the structured textual content when the overall structured textual content is rendered for display are assigned to different dimensions than the dimensional values representing the text of the corresponding discrete portions of the structured textual content; and wherein further the dimensional values representing the visual features comprise dimensional values that are also set based on the text of the corresponding discrete portions of the structured textual content.

A twelfth example is the method of the third, fourth, fifth, sixth or seventh example, wherein the vectors in the first ordered sequence of vectors further comprise dimensional values representing a visual positioning of the corresponding discrete portions of the structured textual content when the overall structured textual content is rendered for display.

A thirteenth example is the method of the twelfth example, further comprising: generating a sequence of visual features vectors, each visual feature vector comprising dimensional values representing the visual features applied to the corresponding discrete portions of the structured textual content when the overall structured textual content is rendered for display; generating a sequence of positional vectors (e.g. 241, FIG. 2*a*), each positional vector comprising dimensional values representing the visual positioning of the corresponding discrete portions of the structured textual content when the overall structured textual content is rendered for display; and generating the vectors of the first ordered sequence of vectors by amalgamating a visual feature vector, from the sequence of visual features vectors, and a positional vector, from the sequence of positional vectors.

A fourteenth example is the method of the first, second, third, fourth, fifth, sixth, seventh, eighth, ninth, tenth, eleventh, twelfth or thirteenth example, wherein the portions of the overall structured textual content are categorized in accordance with categories corresponding to dimensions having a largest dimensional value in the vectors of the third ordered sequence of vectors.

A fifteenth example is the method of the first, second, third, fourth, fifth, sixth, seventh, eighth, ninth, tenth, eleventh, twelfth, thirteenth or fourteenth example, wherein the portions of the overall structured textual content are categorized in accordance with categories corresponding to dimensions having dimensional values, in the vectors of the third ordered sequence of vectors, that are greater than a threshold.

A sixteenth example is the method of the fifteenth example, wherein a first portion of the overall structured textual content is simultaneously categorized into two or more categories.

A seventeenth example is the method of first, second, third, fourth, fifth, sixth, seventh, eighth, ninth, tenth, eleventh, twelfth, thirteenth, fourteenth, fifteenth or sixteenth example, wherein a first portion of the overall structured textual content is categorized in accordance with dimensional values of an aggregated vector generated by summing vectors from the third ordered sequence of vectors corresponding to individual sub-portions of the first portion of the overall structured textual content.

An eighteenth example is the method of seventeenth example, wherein the summing the vectors from the third ordered sequence of vectors that correspond to the individual sub-portions comprises first weighting each individual vector based on a quantity of characters of textual content in a corresponding individual sub-portion.

A nineteenth example is a system for performing automated categorization of discrete portions of an overall structured textual content (e.g. 110, FIG. 1), the system comprising: a first set of computing devices, in aggregate, implementing a neural network (e.g. 260, FIG. 2*b*) comprising one or more neural network layers, each neural network layer utilizing a corresponding set of weight values; a second set of computing devices, in aggregate, implementing a second neural network (e.g. 270, FIG. 2*b*) comprising one or more neural network layers, each neural network layer utilizing a corresponding set of weight values, the weight values corresponding to the neural network layers of the first neural network differing from the weight values corresponding to the neural network layers of the second neural network; and a third set of computing device, in aggregate, categorizing the discrete portions of the overall structured textual content in accordance with dimensional values of a third ordered sequence of vectors (e.g. 271, FIG. 2*b*) output by the second neural network, each dimension of the vectors of the third ordered sequence of vectors corresponding to a category; wherein the first set of computing devices is provided, as input to the first neural network, a first ordered sequence of vectors (e.g. 251, FIG. 2*b*), each vector in the first ordered sequence of vectors corresponding to a discrete portion of the overall structured textual content, the vectors of the first ordered sequence of vectors being ordered based on positioning of corresponding discrete portions of the structured textual content within the overall structured textual content; and wherein the second set of computing devices is provided, as input to the first neural network, a second ordered sequence of vectors (e.g. 261, FIG. 2*b*), each vector in the second ordered sequence of vectors corresponding to a same discrete portion of the overall structured textual content as a corresponding vector from the first ordered sequence of vectors, the first neural network incorporating information from neighboring vectors of the first ordered sequence of vectors into each vector in the second ordered sequence of vectors.

A twentieth example is one or more computer-readable storage media comprising computer-executable instructions, which, when executed, cause one or more computing devices to: provide a first ordered sequence of vectors (e.g. 251, FIG. 2*a*) to a first neural network (e.g. 260, FIG. 2*b*), each vector in the first ordered sequence of vectors corresponding to a discrete portion of an overall structured textual content (e.g. 110, FIG. 1), the vectors of the first ordered sequence of vectors being ordered based on positioning of corresponding discrete portions of the structured textual content within the overall structured textual content; provide a second ordered sequence of vectors (e.g. 261, FIG. 2b) to a second neural network (e.g. 270, FIG. 2b), each vector in the second ordered sequence of vectors corresponding to a same discrete portion of the overall structured textual content as a corresponding vector from the first ordered sequence of vectors, the first neural network incorporating information from neighboring vectors of the first ordered sequence of vectors into each vector in the second ordered sequence of vectors; and categorize portions of the overall structured textual content in accordance with dimensional values of a third ordered sequence of vectors (e.g. 271, FIG. 2b) output by the second neural network, each dimension of the vectors of the third ordered sequence of vectors corresponding to a category.

A twenty-first example is one or more computer-readable storage media comprising computer-executable instructions, which, when executed, cause one or more computing devices to perform any of the methods described herein.

As can be seen from the above descriptions, mechanisms automated structured textual content categorization accuracy with neural networks have been presented. In view of the many possible variations of the subject matter described herein, we claim as our invention all such embodiments as may come within the scope of the following claims and equivalents thereto.

We claim:

1. A method of improving automated structured textual content categorization accuracy, the method comprising:
   providing a first vector to a first neural network, where the first vector corresponds to a first discrete portion of the structured textual content;
   immediately after providing the first vector to the first neural network, providing a second vector to the first neural network, where the second vector corresponds to the second discrete portion of the structured textual content, where the second vector is provided to the first neural network immediately after the first neural network is provided to the first neural network due to the second discrete portion neighboring the first discrete portion in the structured textual content, where the first neural network generates a third vector that corresponds to the first discrete portion based upon the first vector and the second vector, and further where the first neural network generates a fourth vector that corresponds to the second discrete portion based upon the first vector and the second vector;
   providing the third vector to a second neural network, where the second neural network outputs a fifth vector that corresponds to the first discrete portion, and further where the fifth vector includes first values for categories that are assignable to discrete portions of the structured textual document;
   providing the fourth vector to the second neural network, where the second neural network outputs a sixth vector that corresponds to the second discrete portion, and further where the sixth vector includes second values for the categories;
   categorizing the first discrete portion in accordance with the first values of the fifth vector output by the second neural network; and
   categorizing the second discrete portion in accordance with the second values of the sixth vector output by the second neural network.

2. The method of claim 1, further comprising:
   generating a document object model representation of the structured textual content;
   wherein the first discrete portion and the second discrete portion are delineated by discrete leaf nodes of the generated document object model representation.

3. The method of claim 1, wherein the first vector comprises first dimensional values representing first visual features applied to the first discrete portion of the structured textual content when the structured textual content is rendered for display, and further wherein the second vector comprises second dimensional values representing second visual features applied to the second discrete portion of the structured textual content when the structured textual content is rendered for the display.

4. The method of claim 3, wherein the first and second dimensional values comprise dimensional values that are based on fonts associated with the first and second discrete portions of the structured textual content.

5. The method of claim 3, wherein the first and second dimensional values comprise dimensional values that are based on HTML element types associated with the first and second discrete portions of the structured textual content.

6. The method of claim 3, wherein the first and second dimensional values comprise dimensional values based on style sheets associated with the first and second discrete portions of the structured textual content.

7. The method of claim 3, wherein the first and second vectors further comprise dimensional values representing text of the first and second discrete portions of the structured textual content.

8. The method of claim 7, wherein the first and second dimensional values are based on semantic meanings of the text of the first and second discrete portions of the structured textual content.

9. The method of claim 1, further comprising:
   generating a visual feature vector that corresponds to the first discrete portion, the visual feature vector comprising first dimensional values representing visual features applied to the first discrete portion of the structured textual content when the structured textual content is rendered for display;
   generating a text vector that corresponds to the first discrete portion, the text vector comprising second dimensional values representing text of the first discrete portion of the structured textual content; and
   generating the first vector by amalgamating the visual feature vector and the text vector.

10. The method of claim 9, further comprising:
    projecting the text vector to a higher dimensional text vector; and
    projecting the visual feature vector to a higher dimensional visual feature vector;
    wherein the amalgamating comprises adding the higher dimensional text vectors to the higher dimensional visual features vectors.

11. The method of claim 9, wherein the first dimensional values are assigned to different dimensions than the second dimensional values; and
    wherein further the first dimensional values comprise third dimensional values that are based on the text of the first discrete portion.

12. The method of claim 3, wherein the first and second vectors further comprise dimensional values representing visual positionings of the first and second discrete portions of the structured textual content when the structured textual content is rendered for display.

13. The method of claim 1, further comprising:
generating a visual feature vector that corresponds to the first discrete portion, the visual feature vector comprising first dimensional values representing visual features applied to the first discrete portion of the structured textual content when the structured textual content is rendered for display;
generating a positional vector that corresponds to the first discrete portion, the positional vector comprising second dimensional values representing visual positioning of the first discrete portion of the structured textual content when the structured textual content is rendered for display; and
generating the first feature vector by amalgamating the visual feature vector and the positional vector.

14. The method of claim 1, wherein the first discrete portion is categorized in accordance with a category corresponding to a dimension having a largest dimensional value in the fifth vector.

15. The method of claim 1, wherein the first discrete portion is categorized in accordance with categories corresponding to dimensions having dimensional values in the fifth vector that are greater than a threshold.

16. The method of claim 15, wherein the first discrete portion is simultaneously categorized into two or more categories.

17. The method of claim 1, wherein the first discrete portion is categorized in accordance with dimensional values of an aggregated vector generated by summing vectors output by the third neural network, where the vectors correspond to individual sub-portions of the first discrete portion of the structured textual content.

18. The method of claim 17, wherein the summing the vectors comprises first weighting each individual vector based on a quantity of characters of textual content in a corresponding individual sub-portion.

19. One or more computer-readable storage media comprising computer-executable instructions, which, when executed, cause one or more computing devices to perform acts comprising:
providing a first vector to a first neural network, where the first vector corresponds to a first discrete portion of the structured textual content;
immediately after providing the first vector to the first neural network, providing a second vector to the first neural network, where the second vector corresponds to the second discrete portion of the structured textual content, where the second vector is provided to the first neural network immediately after the first neural network is provided to the first neural network due to the second discrete portion neighboring the first discrete portion in the structured textual content, where the first neural network generates a third vector that corresponds to the first discrete portion based upon the first vector and the second vector, and further where the first neural network generates a fourth vector that corresponds to the second discrete portion based upon the first vector and the second vector;
providing the third vector to a second neural network, where the second neural network outputs a fifth vector that corresponds to the first discrete portion, and further where the fifth vector includes first values for categories that are assignable to discrete portions of the structured textual document;
providing the fourth vector to the second neural network, where the second neural network outputs a sixth vector that corresponds to the second discrete portion, and further where the sixth vector includes second values for the categories;
categorizing the first discrete portion in accordance with the first values of the fifth vector output by the second neural network; and
categorizing the second discrete portion in accordance with the second values of the sixth vector output by the second neural network.

* * * * *